(12) United States Patent
Li et al.

(10) Patent No.: US 12,411,796 B2
(45) Date of Patent: Sep. 9, 2025

(54) MANAGEMENT SYSTEM, PROCESSING CHIP, APPARATUS, DEVICE, AND METHOD

(71) Applicant: HUAWEI TECHNOLOGIES CO., LTD., Guangdong (CN)

(72) Inventors: Hong Li, Wuhan (CN); Changzhi Ji, Shenzhen (CN); Kun Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/490,958

(22) Filed: Oct. 20, 2023

(65) Prior Publication Data
US 2024/0045827 A1    Feb. 8, 2024

Related U.S. Application Data

(63) Continuation of application No. PCT/CN2021/139231, filed on Dec. 17, 2021.

(30) Foreign Application Priority Data

Apr. 23, 2021    (CN) .......................... 202110443750.6

(51) Int. Cl.
G06F 13/42    (2006.01)

(52) U.S. Cl.
CPC .. *G06F 13/4282* (2013.01); *G06F 2213/0026* (2013.01); *G06F 2213/0042* (2013.01)

(58) Field of Classification Search
CPC ......... G06F 13/4282; G06F 2213/0026; G06F 2213/0042
See application file for complete search history.

(56) References Cited

U.S. PATENT DOCUMENTS 11,531,634 B2 * 12/2022 Olarig ................. G06F 13/4282
11,983,129 B2 *  5/2024 Olarig ..................... G06F 13/36
(Continued)

FOREIGN PATENT DOCUMENTS

| CN | 108021518 A | 5/2018 |
|----|-------------|--------|
| CN | 209433401 U | 9/2019 |
| EP | 1871040 A1  | 12/2007 |

OTHER PUBLICATIONS

Extended European Search Report in European Appln No. 21937739.7, dated Jul. 29, 2024, 12 pages.
(Continued)

*Primary Examiner* — Henry Tsai
*Assistant Examiner* — Christopher A Daley
(74) *Attorney, Agent, or Firm* — Fish & Richardson P.C.

(57) ABSTRACT

Example management systems and methods are described. In one example, the management system includes at least one processor and a baseboard management controller (BMC). A data bus used for data transmission is included between the at least one processor and the BMC. The at least one processor is configured to convert a first protocol packet including first management data of the system into a second protocol packet, and send the second protocol packet through the data bus. A protocol type of the second protocol packet is a transmission protocol type of the data bus. A protocol type of the first protocol packet is different from the protocol type of the second protocol packet, and a transmission rate of the first protocol packet is lower than a transmission rate of the second protocol packet.

20 Claims, 7 Drawing Sheets

(56) References Cited

U.S. PATENT DOCUMENTS

| | | | |
|---|---|---|---|
| 11,983,138 B2 * | 5/2024 | Olarig | H04L 49/9068 |
| 2014/0344431 A1 * | 11/2014 | Hsu | H04L 41/0213 |
| | | | 709/223 |
| 2016/0246754 A1 * | 8/2016 | Rao | G06F 13/4068 |
| 2019/0004901 A1 | 1/2019 | Ryan et al. | |
| 2023/0169028 A1 * | 6/2023 | Chen | G06F 13/385 |
| | | | 710/315 |

OTHER PUBLICATIONS

International Search Report and Written Opinion in International Appln. No. PCT/CN2021/139231, mailed on Mar. 23, 2022, 13 pages (with English translation).

EP Communicatoin Pursuant to Article 94(3) EPC in European Appln. No. 21937739.7, mailed on Jun. 27, 2025, 9 pages.

* cited by examiner

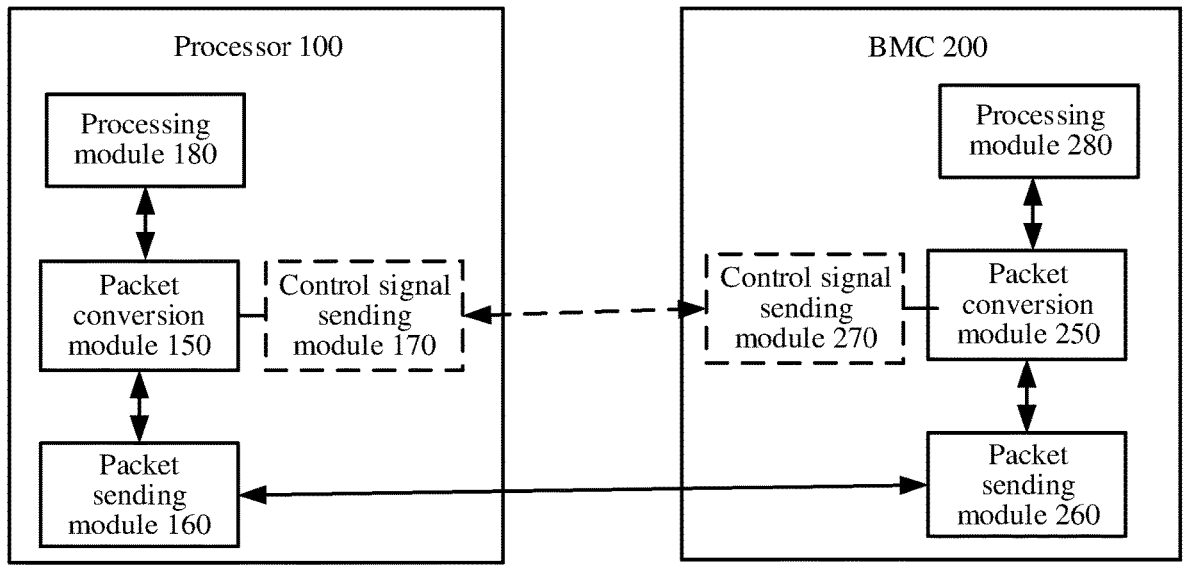

FIG. 4

| A processor converts a first protocol packet including first management data of a management system into a second protocol packet, and sends the second protocol packet through a data bus, where a protocol type of the second protocol packet is a transmission protocol type of the data bus, a protocol type of the first protocol packet is different from the protocol type of the second protocol packet, and a transmission rate of the first protocol packet is lower than a transmission rate of the second protocol packet | — S510 |

| A BMC receives the second protocol packet from the data bus based on a first instruction, converts the second protocol packet into a third protocol packet, and obtains the first management data from the third protocol packet, where a protocol type of the third protocol packet is different from the protocol type of the second protocol packet, and the protocol type of the third protocol packet is the same as the protocol type of the first protocol packet | — S520 |

FIG. 5

MANAGEMENT SYSTEM, PROCESSING CHIP, APPARATUS, DEVICE, AND METHOD

CROSS-REFERENCE TO RELATED APPLICATIONS

This application is a continuation of International Application No. PCT/CN2021/139231, filed on Dec. 17, 2021, which claims priority to Chinese Patent Application No. 202110443750.6, filed on Apr. 23, 2021. The disclosures of the aforementioned applications are hereby incorporated by reference in their entireties.

TECHNICAL FIELD

This application relates to the field of the information technology (IT), and in particular, to a management system, a processing chip, an apparatus, a device, and a method.

BACKGROUND

With the evolution of data center management technologies, server management gradually evolves to automatic or intelligent out-of-band management. Compared with conventional server management, automatic or intelligent management needs more device information. Therefore, a higher requirement is imposed on a management channel for transmitting management data between a baseboard management controller (BMC) and a processor.

Currently, a management channel interface between the BMC and the processor includes a system management bus (SMBUS), a low pin count bus (LPC), and the like. A packet that includes management data and that is of a keyboard controller style (KCS) protocol, block transfer (BT) protocol, or mailbox (MAILBOX) protocol is currently transmitted based on an LPC channel.

However, the LPC is a low-speed bus, and only the LPC channel is used for transmission. This cannot satisfy an increasing requirement for transmitting a large amount of data in out-of-band management.

SUMMARY

Embodiments of this application provide a management system, a processing chip, an apparatus, a device, and a method. A processor in the management system may convert a first protocol packet including first management data of a system into a second protocol packet, and send the second protocol packet through a data bus that is between the processor and a BMC in the management system. In particular, a protocol type of the second protocol packet is a transmission protocol type of the data bus, a protocol type of the first protocol packet is different from the protocol type of the second protocol packet, and a transmission rate of the first protocol packet is lower than a transmission rate of the second protocol packet. In this way, a transmission rate of a packet including the first management data may be improved, limitation on a bus type of the data bus may be reduced, and flexibility of data transmission through the data bus may be improved. A packet including management data is converted into a packet with a high transmission rate. Transmission of the packet with the high transmission rate through a bus is supported, so that a requirement of transmitting a large amount of management data in the management system can be satisfied.

According to a first aspect, embodiments of this application provide a management system that includes a processor and a BMC. A data bus used for data transmission is included between the processor and the BMC. The processor is configured to convert a first protocol packet including first management data of the system into a second protocol packet, and send the second protocol packet through the data bus. A protocol type of the second protocol packet is a transmission protocol type of the data bus, a protocol type of the first protocol packet is different from the protocol type of the second protocol packet, and a transmission rate of the first protocol packet is lower than a transmission rate of the second protocol packet. The BMC is configured to receive the second protocol packet from the data bus based on a first instruction.

In other words, when sending data to the BMC, the processor is responsible for protocol conversion and sending a protocol-converted packet to the BMC through the data bus. The protocol conversion means converting the first protocol packet of the first management data of the system into the second protocol packet that matches the transmission protocol type of the data bus and has a faster transmission rate. In this way, a requirement of transmitting a large amount of management data in the management system is satisfied to a greatest extent.

The processor in this application may be a chip such as a bridge chip, a central processing unit (CPU), a graphics processor (GPU), or a network processor (NPU), a field programmable gate array (FPGA), an application-specific integrated circuit (ASIC), or the like.

The BMC in this application may be a chip such as a CPU, an ASIC, an FPGA, or the like.

The protocol type of the first protocol packet may include one or more of a B T protocol type, a KCS protocol type, and a MAILBOX protocol type. The protocol type of the second protocol packet may include at least one of a peripheral component interconnect express (PCIe) transmission protocol type and a universal serial bus (USB) transmission protocol type.

In a possible implementation, a control bus configured to control the management system to perform data transmission through the data bus is further included between the processor and the BMC.

In other words, in this implementation, in addition to the data bus, the processor and the BMC may further include the control bus. In this way, the processor may send an instruction to the BMC through the control bus to control data transmission performed by the management system through the data bus. This improves data transmission efficiency.

In a possible implementation, a first instruction is an instruction sent by the processor to the BMC through the control bus, or a periodic instruction generated by the BMC. The control bus is a bus that is between the processor and the BMC and that is configured to control the management system to perform data transmission through the data bus.

The instruction sent by the processor to the BMC through the control bus may be an interrupt signal.

That is, in this implementation, the BMC may receive, based on the instruction sent by the processor to the BMC through the control bus, data sent by the processor, or may receive, based on the periodic instruction generated by the BMC, data sent by the processor. This improves flexibility of data receiving.

In a possible implementation, the BMC is further configured to convert the received second protocol packet into a third protocol packet, and obtain the first management data from the third protocol packet, where a protocol type of the third protocol packet is the same as the protocol type of the first protocol packet.

In other words, in this implementation, after receiving the second protocol packet, the BMC further needs to convert the received second protocol packet into the third protocol packet, that is, convert a protocol packet with a high transmission rate into a protocol packet with a low transmission rate, to obtain the first management data of the system.

In a possible implementation, the BMC is further configured to convert a fourth protocol packet including second management data of the system into a fifth protocol packet, and send the fifth protocol packet through the data bus. A protocol type of the fourth protocol packet is different from a protocol type of the fifth protocol packet, and a transmission rate of the fourth protocol packet is lower than a transmission rate of the fifth protocol packet. The processor is configured to receive the fifth protocol packet from the data bus based on a second instruction, where the second instruction is an instruction sent by the BMC to the processor through the control bus, or a periodic instruction generated by the processor. The processor is further configured to convert the received fifth protocol packet into a sixth protocol packet, and obtain the second management data from the sixth protocol packet, where a protocol type of the sixth protocol packet is the same as the protocol type of the fourth protocol packet.

In other words, in this implementation, when the BMC sends data to the processor, the BMC is responsible for converting a protocol packet with a low transmission rate into a protocol packet with a high transmission rate, and sending, to the processor through the data bus, a protocol-converted packet. The processor is responsible for converting the protocol packet with a high transmission rate into a protocol packet with a low transmission rate, to obtain the second management data, so that bidirectional data transmission between the processor and the BMC is implemented.

The protocol type of the fourth protocol packet may include one or more of a BT protocol type, a KCS protocol type, and a MAILBOX protocol type. The protocol type of the fifth protocol packet includes at least one of a PCIe transmission protocol type and a USB transmission protocol type.

The instruction sent by the BMC to the processor through the control bus may be an interrupt signal.

In a possible implementation, the data bus includes at least one of a peripheral component interconnect express PCIe and a universal serial bus USB.

In other words, in this implementation, the data bus that may be used in embodiments of this application may be the PCIe, the USB, or another bus. A packet transmission rate on the PCIe or USB bus is much higher than that on an LPC or an SMBUS bus. This greatly improves transmission efficiency of management data in the management system.

In a possible implementation, the protocol type of the first protocol packet includes one or more of a BT protocol type, a KCS protocol type, and a MAILBOX protocol type.

In other words, in this implementation, the data that can be processed in embodiments of this application is data of the BT protocol type, data of the KCS protocol type, or data of the MAILBOX protocol type.

According to a second aspect, embodiments of this application provide a processing chip. The processing chip includes a processor core, a packet conversion circuit, and a data bus interface circuit. The packet conversion circuit is configured to convert a first protocol packet including first management data into a second protocol packet. The data bus interface circuit is configured to send the second protocol packet. A protocol type of the second protocol packet is a transmission protocol type of the data bus interface circuit, a protocol type of the first protocol packet is different from the protocol type of the second protocol packet, and a transmission rate of the first protocol packet is lower than a transmission rate of the second protocol packet.

In other words, the packet conversion circuit in embodiments of this application is responsible for protocol conversion, and the data bus interface circuit is responsible for sending a protocol-converted packet. The protocol conversion means converting the first protocol packet of the first management data of a system into the second protocol packet that meets a transmission protocol type of the data bus and has a faster transmission rate. In this way, a requirement of transmitting a large amount of management data in a management system is satisfied to a greatest extent.

The processing chip in embodiments of this application may include two types of chips, namely, a processor and a BMC.

For a chip such as the processor, in addition to converting the first protocol packet of the first management data into the second protocol packet through a packet conversion circuit of the processor, and sending the second protocol packet through a data bus interface circuit of the processor, the processor may further receive a fifth protocol packet from the BMC through the data bus interface circuit of the processor. The fifth protocol packet is a packet obtained by converting, by the BMC through a packet conversion circuit of the BMC, a fourth protocol packet that includes second management data of the system. The processor converts, through the packet conversion circuit of the processor, the fifth protocol packet into a sixth protocol packet, and obtains the second management data from the sixth protocol packet. A protocol type of the sixth protocol packet is the same as a protocol type of the fourth protocol packet.

For a chip such as the BMC, in addition to receiving the second protocol packet through the data bus interface circuit of the BMC, the BMC may further convert the second protocol packet into a third protocol packet through the packet conversion circuit of the BMC, and obtain the first management data from the third protocol packet. A protocol type of the third protocol packet is the same as the protocol type of the first protocol packet; and/or the BMC converts, through the packet conversion circuit of the BMC, the fourth protocol packet including the second management data of the system into the fifth protocol packet, and sends the fifth protocol packet through the data bus interface circuit of the BMC, where the protocol type of the fourth protocol packet is different from the protocol type of a fifth protocol packet. In addition, a transmission rate of the fourth protocol packet is lower than a transmission rate of the fifth protocol packet.

The protocol type of the first protocol packet may include one or more of a BT protocol type, a KCS protocol type, and a MAILBOX protocol type. The protocol type of the second protocol packet includes at least one of the PCIe transmission protocol type and the USB transmission protocol type. The protocol type of the fourth protocol packet may include one or more of the BT protocol type, the KCS protocol type, and the MAILBOX protocol type. The protocol type of the fifth protocol packet includes at least one of the PCIe transmission protocol type and the USB transmission protocol type.

In a possible implementation, the processing chip further includes a control bus circuit. The control bus circuit is configured to send an instruction, and a first instruction indicates to receive the second protocol packet.

The processing chip in embodiments of this application may include two types of chips, namely, a processor and a BMC.

For a chip such as the processor, the processor may send, through a control bus circuit of the processor, an instruction indicating to receive the second protocol packet. Preferably, the instruction may be an interrupt signal.

For a chip such as the BMC, the BMC may send, through a control bus circuit of the BMC, an instruction indicating to receive the fifth protocol packet. Preferably, the instruction may be an interrupt signal.

In a possible implementation, the packet conversion circuit is further configured to generate the first instruction, where the first instruction indicates to receive the second protocol packet.

The processing chip in embodiments of this application may include two types of chips, namely, a processor and a BMC.

For a chip such as the processor, the processor may generate, through a packet conversion circuit of the processor, an instruction indicating to receive the second protocol packet.

For a chip such as the BMC, the BMC may generate, through a packet conversion circuit of the BMC, an instruction indicating to receive the fifth protocol packet.

In a possible implementation, the data bus interface circuit includes at least one of a PCIe interface circuit and a USB interface circuit.

In other words, in this implementation, the data bus interface circuit that may be used in embodiments of this application may be the PCIe interface circuit, the USB interface circuit, or another bus interface circuit. A packet transmission rate on the PCIe or USB bus is much higher than that on an LPC or an SMBUS bus. This greatly improves transmission efficiency of management data in the management system.

In a possible implementation, the protocol type of the first protocol packet includes one or more of a BT protocol type, a KCS protocol type, and a MAILBOX protocol type.

According to a third aspect, embodiments of this application provide a packet processing apparatus. The packet processing apparatus includes a packet conversion module and a packet sending module. The packet conversion module is configured to convert a first protocol packet including first management data into a second protocol packet. The packet sending module is configured to send the second protocol packet. A protocol type of the second protocol packet is a protocol type supported by the packet sending module, a protocol type of the first protocol packet is different from the protocol type of the second protocol packet, and a transmission rate of the first protocol packet is lower than a transmission rate of the second protocol packet.

In other words, the packet conversion module in embodiments of this application is responsible for protocol conversion, and the packet sending module is responsible for sending a protocol-converted packet. The protocol conversion means converting the first protocol packet of the first management data of a system into the second protocol packet that meets a transmission protocol type of a data bus and has a faster transmission rate. In this way, a requirement of transmitting a large amount of management data in a management system is satisfied to a greatest extent. The packet conversion module in embodiments of this application may be a software module, or may be a hardware module.

In addition, the packet processing apparatus in embodiments of this application may include a processor and a BMC.

For a processing apparatus such as the processor, in addition to converting the first protocol packet of the first management data into the second protocol packet through a packet conversion module of the processor, and sending the second protocol packet through a packet sending module of the processor, the processor may further receive a fifth protocol packet from the BMC through the packet sending module of the processor. The fifth protocol packet is a packet obtained by converting, by the BMC through a packet conversion module of the BMC, a fourth protocol packet that includes second management data of the system. The processor converts, through the packet conversion module of the processor, the fifth protocol packet into a sixth protocol packet, and obtains the second management data from the sixth protocol packet. A protocol type of the sixth protocol packet is the same as a protocol type of the fourth protocol packet.

For a processing apparatus such as the BMC, in addition to receiving the second protocol packet through a packet sending module of the BMC, the BMC may further convert the second protocol packet into a third protocol packet through the packet conversion module of the BMC, and obtain the first management data from the third protocol packet. A protocol type of the third protocol packet is the same as the protocol type of the first protocol packet; and/or the BMC converts, through the packet conversion module of the BMC, the fourth protocol packet including the second management data of the system into the fifth protocol packet, and sends the fifth protocol packet through the packet sending module of the BMC. The protocol type of the fourth protocol packet is different from a protocol type of the fifth protocol packet. In addition, a transmission rate of the fourth protocol packet is lower than a transmission rate of the fifth protocol packet.

The protocol type of the first protocol packet may include one or more of a BT protocol type, a KCS protocol type, and a MAILBOX protocol type. The protocol type of the second protocol packet includes at least one of a PCIe transmission protocol type and a USB transmission protocol type. The protocol type of the fourth protocol packet may include one or more of a BT protocol type, a KCS protocol type, and a MAILBOX protocol type. The protocol type of the fifth protocol packet includes at least one of a PCIe transmission protocol type and a USB transmission protocol type.

In a possible implementation, the packet processing apparatus further includes a control signal sending module. The control signal sending module is configured to send a first instruction, and the first instruction indicates to receive the second protocol packet. The packet processing apparatus in embodiments of this application may include a processor and a BMC.

For a processing apparatus such as the processor, the processor may send, through a control signal sending module of the processor, an instruction indicating to receive the second protocol packet. Preferably, the instruction may be an interrupt signal.

For a processing apparatus such as the BMC, the BMC may send, through a control signal sending module of the BMC, an instruction indicating to receive the fifth protocol packet. Preferably, the instruction may be an interrupt signal.

In a possible implementation, the packet conversion module is further configured to generate the first instruction, where the first instruction indicates to receive the second protocol packet.

The packet processing apparatus in embodiments of this application may include a processor and a BMC.

For a processing apparatus such as the processor, the processor may generate, through a packet conversion module, an instruction indicating to receive the second protocol packet.

For a processing apparatus such as the BMC, the BMC may generate, through a packet conversion module of the BMC, an instruction indicating to receive the fifth protocol packet.

In a possible implementation, the packet sending module includes at least one of a PCIe interface module and a USB interface module.

In other words, in this implementation, the packet sending module that may be used in embodiments of this application may be the PCIe interface module, the USB interface module, or another bus interface module. A packet transmission rate on the PCIe or USB bus is much higher than that on an LPC or an SMBUS bus. This greatly improves transmission efficiency of management data in the management system. In a possible implementation, the protocol type of the first protocol packet includes one or more of a block transfer BT protocol type, a keyboard controller style KCS protocol type, and a mailbox MAILBOX protocol type.

According to a fourth aspect, embodiments of this application provide a system management method. The method includes: converting a first protocol packet including first management data of a system into a second protocol packet, and sending the second protocol packet through a data bus, where a protocol type of the second protocol packet is a transmission protocol type of the data bus, a protocol type of the first protocol packet is different from the protocol type of the second protocol packet, and a transmission rate of the first protocol packet is lower than a transmission rate of the second protocol packet; receiving the second protocol packet from the data bus based on a first instruction; converting the second protocol packet into a third protocol packet, where a protocol type of the third protocol packet is different from the protocol type of the second protocol packet, and the protocol type of the third protocol packet is the same as the protocol type of the first protocol packet; and obtaining the first management data from the third protocol packet.

In other words, in the method, a packet including management data may be converted into a packet with a high transmission rate, and transmission of the packet with the high transmission rate through a bus is supported, so that a requirement of transmitting a large amount of management data in a management system is satisfied.

The first instruction may be an instruction generated by a control bus, or may be an instruction generated periodically.

For example, when sending data to a BMC, a processor is responsible for converting the first protocol packet that includes the first management data of the system into the second protocol packet, and sending the second protocol packet through the data bus, where the protocol type of the second protocol packet is a transmission protocol type of the data bus. The protocol type of the first protocol packet is different from the protocol type of the second protocol packet, and the transmission rate of the first protocol packet is lower than the transmission rate of the second protocol packet. The BMC is responsible for receiving the second protocol packet from the data bus based on the first instruction; converting the second protocol packet into a third protocol packet, where a protocol type of the third protocol packet is different from the protocol type of the second protocol packet, and the protocol type of the third protocol packet is the same as the protocol type of the first protocol packet; and obtaining the first management data from the third protocol packet.

In other words, in this implementation, when sending data to the BMC, the processor is responsible for protocol conversion and sending a protocol-converted packet to the BMC through the data bus. The protocol conversion means converting the first protocol packet of the first management data of the system into the second protocol packet that meets the transmission protocol type of the data bus and has a faster transmission rate. In this way, a requirement of transmitting a large amount of management data in a management system is satisfied to a greatest extent. The first instruction is an instruction (for example, an interrupt signal) sent by the processor to the BMC through the control bus, or a periodic instruction generated by the BMC.

For another example, when the BMC sends data to the processor, the BMC is further responsible for converting the fourth protocol packet including the second management data of the system into a fifth protocol packet, and sending the fifth protocol packet through the data bus, where a protocol type of the fourth protocol packet is different from a protocol type of the fifth protocol packet. In addition, a transmission rate of the fourth protocol packet is lower than a transmission rate of the fifth protocol packet. The processor is responsible for receiving the fifth protocol packet from the data bus based on a second instruction, where the second instruction is an instruction (for example, an interrupt signal) sent by the BMC to the processor through the control bus, or a periodic instruction generated by the processor. The processor is further responsible for converting the received fifth protocol packet into a sixth protocol packet, and obtaining the second management data from the sixth protocol packet, where a protocol type of the sixth protocol packet is the same as the protocol type of the fourth protocol packet.

In other words, in this implementation, when the BMC sends data to the processor, the BMC is responsible for protocol conversion, and sending a protocol-converted packet to the processor through the data bus. The processor is responsible for converting the received fifth protocol packet into the sixth protocol packet, to obtain the second management data, so that bidirectional data transmission between the processor and the BMC is implemented.

In a possible implementation, the second protocol packet includes at least one of a PCIe packet and a USB packet.

In other words, in this implementation, a protocol packet that may be obtained through conversion in embodiments of this application may be the PCIe packet, the USB packet, or another bus packet. A packet transmission rate on the PCIe or USB bus is much higher than that on an LPC or an SMBUS bus. This greatly improves transmission efficiency of management data in the management system.

In a possible implementation, the protocol type of the first protocol packet or the third protocol packet includes one or more of a BT protocol type, a KCS protocol type, and a MAILBOX protocol type.

According to a fifth aspect, embodiments of this application provide a computing device, where the computing device includes a processor, a BMC, and a memory. The memory stores computer instructions. The processor and the BMC execute the computer instructions, so that the computing device performs the method according to the fourth aspect.

According to the management system, the processing chip, the apparatus, the device, and the method provided in embodiments of this application, the processor in the management system converts the first protocol packet including the first management data of the system into the second protocol packet, and sends the second protocol packet through the data bus that is between the processor and the BMC in the management system. In particular, the protocol type of the second protocol packet is the transmission protocol type of the data bus, the protocol type of the first protocol packet is different from the protocol type of the second protocol packet, and the transmission rate of the first protocol packet is lower than the transmission rate of the second protocol packet. In this way, a transmission rate of a packet including the first management data is increased, limitation on a bus type of the data bus is also reduced, and flexibility of performing data transmission through the data bus is improved. A packet including management data is converted into a packet with a high transmission rate, and transmission of the packet with the high transmission rate through a bus is supported, so that a requirement of transmitting a large amount of management data in the management system is satisfied.

BRIEF DESCRIPTION OF DRAWINGS

FIG. 4 is an architecture diagram of a management system according to an embodiment of this application;

FIG. 5 is a flowchart of a system management method according to an embodiment of this application;

DESCRIPTION OF EMBODIMENTS

Figure 1:
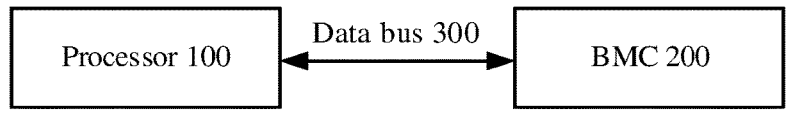
FIG. 1 is an architecture diagram of a management system according to an embodiment of this application.

To make objectives, technical solutions, and advantages of embodiments of this application clearer, the following describes the technical solutions in embodiments of this application with reference to the accompanying drawings.

In the description of embodiments of this application, words such as "for example" or "as an example" are used to represent an example, an evidence, or a description. Any embodiment or design solution described as "for example" or "as an example" in embodiments of this application should not be interpreted as being more preferred or advantageous than another embodiment or design solution. Specifically, the use of the words "for example" or "as an example" is intended to present the related concept in a concrete manner.

In the description of embodiments of this application, the term "and/or" is merely an association relationship for describing associated objects, and indicates that three relationships may exist. For example, A and/or B may indicate: Only A exists, only B exists, and both A and B exist. In addition, unless otherwise specified, the term "a plurality" means two or more. For example, the plurality of systems refers to two or more systems, and the plurality of screen terminals refers to two or more screen terminals.

In addition, the terms "first" and "second" are used only for the purpose of description, and cannot be understood as indicating or implying relative importance or implicitly indicating the indicated technical features. Therefore, the feature defined with the "first" and the "second" may explicitly or implicitly include one or more of the features. The terms "include", "contain", "have", and variations thereof all mean "including, but not limited to", unless otherwise specified.

With the evolution of data center management technologies, server management gradually evolves to automatic or intelligent management. Compared with conventional server management, automatic or intelligent management needs more device information. Therefore, a higher requirement is imposed on a management channel for transmitting management data between a BMC and a processor. Currently, a management channel interface between the BMC and a host includes an SMBUS and an LPC. A packet that includes management data and that is of a KCS, a BT, or a MAILBOX protocol is transmitted through an LPC channel. However, the LPC is a low-speed bus, and only the LPC channel is used for transmission. This cannot satisfy an increasing requirement for transmitting a large amount of management data in a management system.

To resolve the foregoing technical problem, this application provides a management system, a processing chip, an apparatus, a device, and a method. A processor in the management system may convert a first protocol packet including first management data of the system into a second protocol packet, and send the second protocol packet through a data bus between a processor and a BMC in the management system. Especially, a protocol type of the second protocol packet is a transmission protocol type of the data bus, and a protocol type of the first protocol packet is different from the protocol type of the second protocol packet. In addition, a transmission rate of the first protocol packet is lower than a transmission rate of the second protocol packet. In this way, limitation on a bus type of the data bus can be reduced, and flexibility of performing data transmission through the data bus can be improved, a requirement of transmitting a large amount of management data in the management system can be satisfied.

The following provides description by using specific embodiments.

FIG. 1 is an architecture diagram of a management system according to an embodiment of this application. As shown in FIG. 1, the management system includes a processor 100 and a BMC 200, and a data bus 300 used for data transmission is included between the processor 100 and the BMC 200. The processor 100 may be a chip such as a bridge chip, a CPU, a GPU, an NPU, an FPGA, an ASIC, or a like. The BMC 200 may be a chip such as the CPU, the ASIC, or the FPGA. The data bus 300 may be a PCIe, a USB, or may be another bus.

(1) The Processor 100 Sends Data to the BMC 200

The processor 100 is configured to convert a first protocol packet including first management data of a system into a second protocol packet, and send the second protocol packet through the data bus 300, where a protocol type of the second protocol packet is a transmission protocol type of the data bus 300. A protocol type of the first protocol packet is different from a protocol type of the second protocol packet, and a transmission rate of the first protocol packet is lower than a transmission rate of the second protocol packet; the BMC 200 is configured to receive the second protocol packet from a data bus based on a first instruction, convert the received second protocol packet into a third protocol packet, and obtain first management data from the third protocol packet, where a protocol type of the third protocol packet is the same as the protocol type of the first protocol packet.

The protocol type of the first protocol packet may be a BT protocol type, a KCS protocol type, or a MAILBOX protocol type; the protocol type of the second protocol packet may be a PCIe transmission protocol type, a USB transmission protocol type, or a transmission protocol type of another bus.

Figure 2:
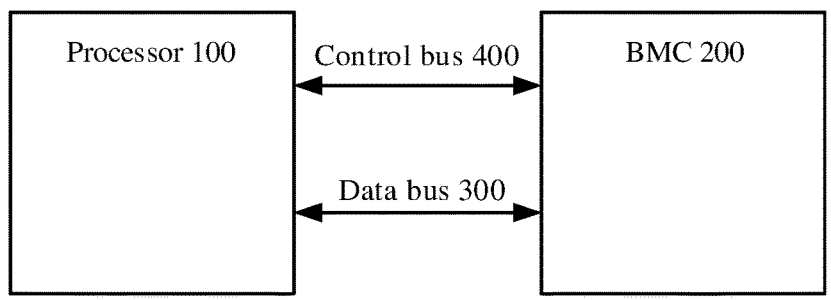
FIG. 2 is an architecture diagram of a management system according to an embodiment of this application.

The first instruction may be an instruction (for example, an interrupt signal) sent by the processor 100 to the BMC 200 through a control bus 400 in FIG. 2, or may be a periodic instruction generated by the BMC 200; the control bus 400 in FIG. 2 is a bus that is between the processor 100 and the BMC 200 and that is configured to control the management system to perform data transmission through the data bus.

For example, the protocol type of the first packet is a type such as KCS, BT, or MAILBOX. The protocol type of the second packet is a PCIe bus or USB. The processor 100 is responsible for converting a packet of a type such as KCS, BT, or MAILBOX into a PCIe bus or USB packet, and sending a PCIe bus or USB packet through the data bus 300. The BMC 200 receives the PCIe bus or USB packet based on a periodic instruction generated by the BMC 200, that is, the BMC 200 receives the PCIe bus or USB packet in a polling manner.

For another example, the protocol type of the first packet is a type such as KCS, BT, or MAILBOX, and the protocol type of the second packet is a PCIe bus or USB. The processor 100 is responsible for converting a packet of a type such as KCS, BT, or MAILBOX into a PCIe bus or USB packet, sending the PCIe bus or USB packet through the data bus 300, and sending, through the control bus 400, an instruction (for example, an interrupt signal) indicating the BMC to receive the PCIe bus or USB packet. The BMC 200 receives the PCIe bus or USB packet based on the instruction (for example, the interrupt signal) indicating the BMC to receive the PCIe bus or USB packet.

It can be learned that when the processor 100 sends data to the BMC 200, the processor 100 is responsible for protocol conversion and sending a protocol-converted packet to the BMC 200 through the data bus. The protocol conversion is to convert the first protocol packet of the first management data of the system into the second protocol packet that meets a transmission protocol type of a data bus and has a faster transmission rate. In this way, a requirement of transmitting a large amount of management data in a management system is satisfied to a greatest extent.

(2) The BMC 200 Sends Data to the Processor 100

The BMC 200 is further configured to convert a fourth protocol packet including second management data of the system into a fifth protocol packet, and send the fifth protocol packet through the data bus 300, where a protocol type of the fourth protocol packet is different from a protocol type of the fifth protocol packet. In addition, a transmission rate of the fourth protocol packet is lower than a transmission rate of the fifth protocol packet; the processor 100 is configured to receive the fifth protocol packet from the data bus 300 based on the second instruction, convert the received fifth protocol packet into a sixth protocol packet, and obtain the second management data from the sixth protocol packet, where a protocol type of the sixth protocol packet is the same as the protocol type of the fourth protocol packet.

The protocol type of the fourth protocol packet may be a BT protocol type, a KCS protocol type, or a MAILBOX protocol type. The protocol type of the fifth protocol packet may be a PCIe transmission protocol type, a USB transmission protocol type, or a transmission protocol type of another bus.

The second instruction may be an instruction (for example, an interrupt signal) sent by the BMC 200 to the processor 100 through a control bus 400 in FIG. 2, or a periodic instruction generated by the processor 100.

For example, a protocol type of the third packet is a type such as KCS, BT, or MAILBOX, and the protocol type of the fourth packet is a PCIe bus or USB. The BMC 200 is responsible for converting a packet of a type such as KCS, BT, or MAILBOX into a PCIe bus or USB packet, and sending the PCIe bus or USB packet through the data bus 300. The processor 100 receives the PCIe bus or USB packet based on the periodic instruction generated by the processor 100. That is, the processor 100 receives the PCIe bus or USB packet in the polling manner, and converts the PCIe bus or USB packet into a packet of a type such as KCS, BT, or MAILBOX.

For another example, the protocol type of the first packet is a type such as KCS, BT, or MAILBOX, and the protocol type of the second packet is a PCIe bus or USB. The BMC 200 is responsible for converting a packet of a type such as KCS, BT, or MAILBOX into a PCIe bus or USB packet, sending the PCIe bus or USB packet through the data bus 300, and sending, through the control bus 400, an instruction (for example, an interrupt signal) indicating the processor 100 to receive the PCIe bus or USB packet. The processor 100 receives the PCIe bus or USB packet based on the instruction (for example, the interrupt signal) indicating the processor 100 to receive the PCIe bus or USB packet, and converts the PCIe bus or USB packet into a packet of a type such as KCS, BT, or MAILBOX.

It can be learned that, when the BMC 200 sends data to the processor 100, the BMC 200 is responsible for converting a protocol packet with a low transmission rate into a protocol packet with a high transmission rate, and sending, to the processor through the data bus, a protocol-converted packet. The processor 100 is responsible for converting a protocol packet with a high transmission rate into a protocol packet with a low transmission rate, to obtain the second management data, so that bidirectional data transmission between the processor 100 and the BMC 200 is implemented.

Figure 3:
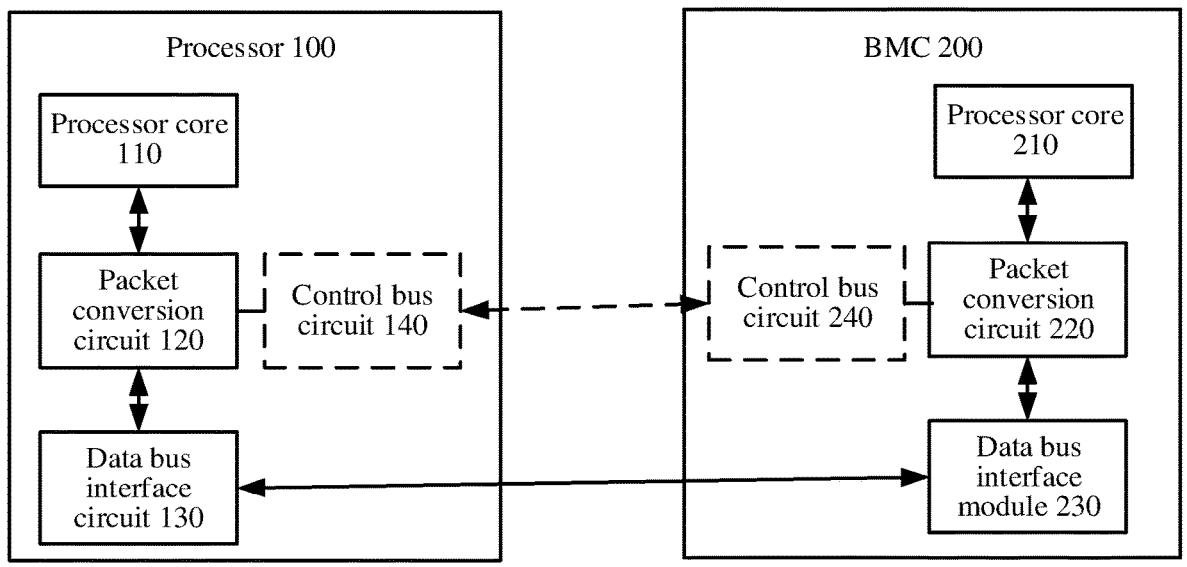
FIG. 3 is an architecture diagram of a management system according to an embodiment of this application.

FIG. 3 is an architecture diagram of a management system according to an embodiment of this application. As shown in FIG. 3, the management system includes two types of processing chips: a processor 100 and a BMC 200. Compared with the embodiment including a data bus shown in FIG. 1, the processor 100 in FIG. 3 specifically includes a processor core 110, a packet conversion circuit 120, and a data bus interface circuit 130. The BMC 200 in FIG. 3 specifically includes a processor core 210, a packet conversion circuit 220, and a data bus interface circuit 230. Optionally, compared with the embodiment that includes the data bus and the control bus shown in FIG. 2, the processor 100 in FIG. 3 may further include a control bus circuit 140.

The BMC 200 in FIG. 3 may further include a control bus circuit 240. The control bus circuit 140 and the packet conversion circuit 120 may be integrated or separated. The control bus circuit 240 and the packet conversion circuit 220 may be integrated or separated.

(1) The Processor 100 Sends Data to the BMC 200

The packet conversion circuit 120 is configured to convert a first protocol packet including first management data into a second protocol packet. The data bus interface circuit 130 is configured to send the second protocol packet. A protocol type of the second protocol packet is a transmission protocol type of the data bus interface circuit, a protocol type of the first protocol packet is different from the protocol type of the second protocol packet, and a transmission rate of the first protocol packet is lower than a transmission rate of the second protocol packet. The packet conversion circuit 220 is configured to receive the second protocol packet from the data bus interface circuit 230 based on a first instruction, convert the received second protocol packet into a third protocol packet, and obtain the first management data from the third protocol packet. A protocol type of the third protocol packet is the same as the protocol type of the first protocol packet.

The protocol type of the first protocol packet may be a BT protocol type, a KCS protocol type, or a MAILBOX protocol type. The protocol type of the second protocol packet may be a PCIe transmission protocol type, a USB transmission protocol type, or a transmission protocol type of another bus.

The first instruction may be an instruction that is generated by the packet conversion circuit 120 and that indicates to receive the second protocol packet, and the control bus circuit 140 is configured to send an instruction that indicates to receive the second protocol packet. The first instruction may also be a periodic instruction generated by the packet conversion circuit 220.

It can be learned that, when the processor 100 sends data to the BMC 200, the packet conversion circuit 120 is responsible for protocol conversion, and the data bus interface circuit 130 is responsible for sending a protocol-converted packet. Protocol conversion is to convert a first protocol packet of the first management data of a system into a second protocol packet that meets a transmission protocol type of a data bus and has a faster transmission rate. In this way, a requirement of transmitting a large amount of management data in a management system is satisfied to a greatest extent.

(2) The BMC 200 Sends Data to the Processor 100

The packet conversion circuit 220 is further configured to convert a fourth protocol packet including second management data of the system into the fifth protocol packet, and the data bus interface circuit 230 is configured to send the fifth protocol packet; a protocol type of the fourth protocol packet is different from a protocol type of the fifth protocol packet, and a transmission rate of the fourth protocol packet is lower than a transmission rate of the fifth protocol packet; the packet conversion circuit 120 is further configured to receive the fifth protocol packet from the data bus interface circuit 130 based on a second instruction, convert the received fifth protocol packet into a sixth protocol packet, and obtain the second management data from the sixth protocol packet. A protocol type of the sixth protocol packet is the same as the protocol type of the fourth protocol packet.

The protocol type of the fourth protocol packet may be a BT protocol type, a KCS protocol type, or a MAILBOX protocol type; the protocol type of the fifth protocol packet may be a PCIe transmission protocol type, a USB transmission protocol type, or a transmission protocol type of another bus.

The second instruction may be an instruction that is generated by the packet conversion circuit 220 and that indicates to receive the fifth protocol packet. The control bus circuit 240 is configured to send an instruction that indicates to receive the fifth protocol packet. The second instruction may also be a periodic instruction generated by the packet conversion circuit 120.

It can be learned that, when the BMC 200 sends data to the processor 100, the packet conversion circuit 220 is responsible for converting a protocol packet with a low transmission rate into a protocol packet with a high transmission rate, and the data bus interface circuit 230 is responsible for sending a protocol-converted packet. The packet conversion circuit 120 is responsible for converting a protocol packet with a high transmission rate into a protocol packet with a low transmission rate, to obtain the second management data, so that bidirectional data transmission between the processor 100 and the BMC 200 is implemented.

FIG. 4 is an architecture diagram of a management system according to an embodiment of this application. As shown in FIG. 4, the management system includes two packet processing apparatuses: a processor 100 and a BMC 200. Compared with the embodiment including a data bus shown in FIG. 1, the processor 100 in FIG. 2 specifically includes a processing module 180, a packet conversion module 150, and a packet sending module 160. The BMC 200 in FIG. 4 specifically includes a processing module 280, a packet conversion module 250, and a packet sending module 260. A data bus 300 used for data transmission may be included between the packet sending module 160 and the packet sending module 260. Optionally, compared with the embodiment that includes a data bus and a control bus shown in FIG. 2, the processor 100 in FIG. 4 may further include a control signal sending module 170. The BMC 200 in FIG. 4 may further include a control signal sending module 270. The packet conversion module 150 may be a hardware module or a software module. The packet conversion module 250 may be a hardware module or a software module. The control signal sending module 170 may be a hardware module or a software module. The control signal sending module 270 may be a hardware module, or may be a software module. In addition, the packet conversion module 150 and the control signal sending module 170 may be integrated or separated. The packet conversion module 250 and the control signal sending module 270 may be integrated or separated.

(1) The Processor 100 Sends Data to the BMC 200

The packet conversion module 150 is configured to convert a first protocol packet including first management data into a second protocol packet; the packet sending module 160 is configured to send a second protocol packet; a protocol type of the second protocol packet is a transmission protocol type of a data bus interface circuit, a protocol type of the first protocol packet is different from the protocol type of the second protocol packet, and a transmission rate of the first protocol packet is lower than a transmission rate of the second protocol packet. The packet conversion module 250 is configured to: receive the second protocol packet from the packet sending module 260 based on a first instruction, convert the received second protocol packet into a third protocol packet, and obtain the first management data from the third protocol packet. A protocol type of the third protocol packet is the same as the protocol type of the first protocol packet.

The protocol type of the first protocol packet may be a BT protocol type, a KCS protocol type, or a MAILBOX protocol type; the protocol type of the second protocol packet may be a PCIe transmission protocol type, a USB transmission protocol type, or a transmission protocol type of another bus.

The first instruction may be an instruction that is generated by the packet conversion module 150 and that indicates to receive the second protocol packet. The control signal sending module 170 in FIG. 4 is configured to send an instruction that indicates to receive the second protocol packet. The first instruction may also be a periodic instruction generated by the packet conversion circuit 220.

In some embodiments, the processor 100 may further include a packet driving module, and the packet driving module is configured to construct the first protocol packet. For example, the first protocol packet is a packet of a type such as KCS, BT, or MAILBOX.

It can be learned that, when the processor 100 sends data to the BMC 200, the packet conversion module 150 is responsible for protocol conversion, and the packet sending module 160 is responsible for sending a protocol-converted packet. Protocol conversion is to convert a first protocol packet of first management data of a system into a second protocol packet that meets a transmission protocol type of a data bus and has a faster transmission rate. In this way, a requirement of transmitting a large amount of management data in a management system is satisfied to a greatest extent.

(2) The BMC 200 Sends Data to the Processor 100

The packet conversion module 250 is further configured to convert a fourth protocol packet including second management data of the system into a fifth protocol packet, and the packet sending module 260 is configured to send the fifth protocol packet; a protocol type of the fourth protocol packet is different from a protocol type of the fifth protocol packet, and a transmission rate of the fourth protocol packet is lower than a transmission rate of the fifth protocol packet; the packet conversion module 150 is further configured to receive the fifth protocol packet from the packet sending module 160 based on the second instruction, convert the received fifth protocol packet into a sixth protocol packet, and obtain second management data from the sixth protocol packet. A protocol type of the sixth protocol packet is the same as the protocol type of the fourth protocol packet.

The protocol type of the fourth protocol packet may be a BT protocol type, a KCS protocol type, or a MAILBOX protocol type; the protocol type of the fifth protocol packet may be a PCIe transmission protocol type, a USB transmission protocol type, or a transmission protocol type of another bus.

The second instruction may be an instruction that is generated by the packet conversion module 250 and that indicates to receive the fifth protocol packet. The control signal sending module 270 in FIG. 4 is configured to send an instruction that indicates to receive the fifth protocol packet. The second instruction may also be a periodic instruction generated by the packet conversion module 150.

In some embodiments, the BMC 200 may further include a packet driving module, and the packet driving module is configured to construct a fourth protocol packet. For example, the fourth protocol packet is a packet of a type such as KCS, BT, or MAILBOX.

It can be learned that, when the BMC 200 sends data to the processor 100, the packet conversion module 250 is responsible for converting a protocol packet with a low transmission rate into a protocol packet with a high transmission rate, and the packet sending module 260 is responsible for sending a protocol-converted packet. The packet conversion module 150 is responsible for converting a protocol packet with a high transmission rate into a protocol packet with a low transmission rate, to obtain the second management data, so that bidirectional data transmission between the processor 100 and the BMC 200 is implemented.

FIG. 5 is a flowchart of a system management method according to an embodiment of this application. The system management method may be applied to the management system shown in any one of FIG. 1 to FIG. 4. As shown in FIG. 5, the system management method may include the following steps:

S510: A processor converts a first protocol packet including first management data of a management system into a second protocol packet, and sends the second protocol packet through a data bus. A protocol type of the second protocol packet is a transmission protocol type of the data bus, a protocol type of the first protocol packet is different from the protocol type of the second protocol packet. A transmission rate of the first protocol packet is lower than a transmission rate of the second protocol packet.

S520: The BMC receives the second protocol packet from the data bus based on a first instruction, converts the second protocol packet into a third protocol packet, and obtains the first management data from the third protocol packet. A protocol type of the third protocol packet is different from the protocol type of the second protocol packet, and the protocol type of the third protocol packet is the same as the protocol type of the first protocol packet.

The protocol type of the first protocol packet may be a BT protocol type, a KCS protocol type, or a MAILBOX protocol type; the protocol type of the second protocol packet may be a PCIe transmission protocol type, a USB transmission protocol type, or a transmission protocol type of another bus.

It can be learned that, when sending data, the processor is responsible for protocol conversion and sending a protocol-converted packet to the BMC through the data bus. The protocol conversion means converting the first protocol packet of the first management data of the system into the second protocol packet that matches the transmission protocol type of the data bus and has a faster transmission rate. In this way, a requirement of transmitting a large amount of management data in a management system is satisfied to a greatest extent. The first instruction is an instruction (for example, an interrupt signal) sent by the processor to the BMC through a control bus, or a periodic instruction generated by the BMC.

Figure 6:
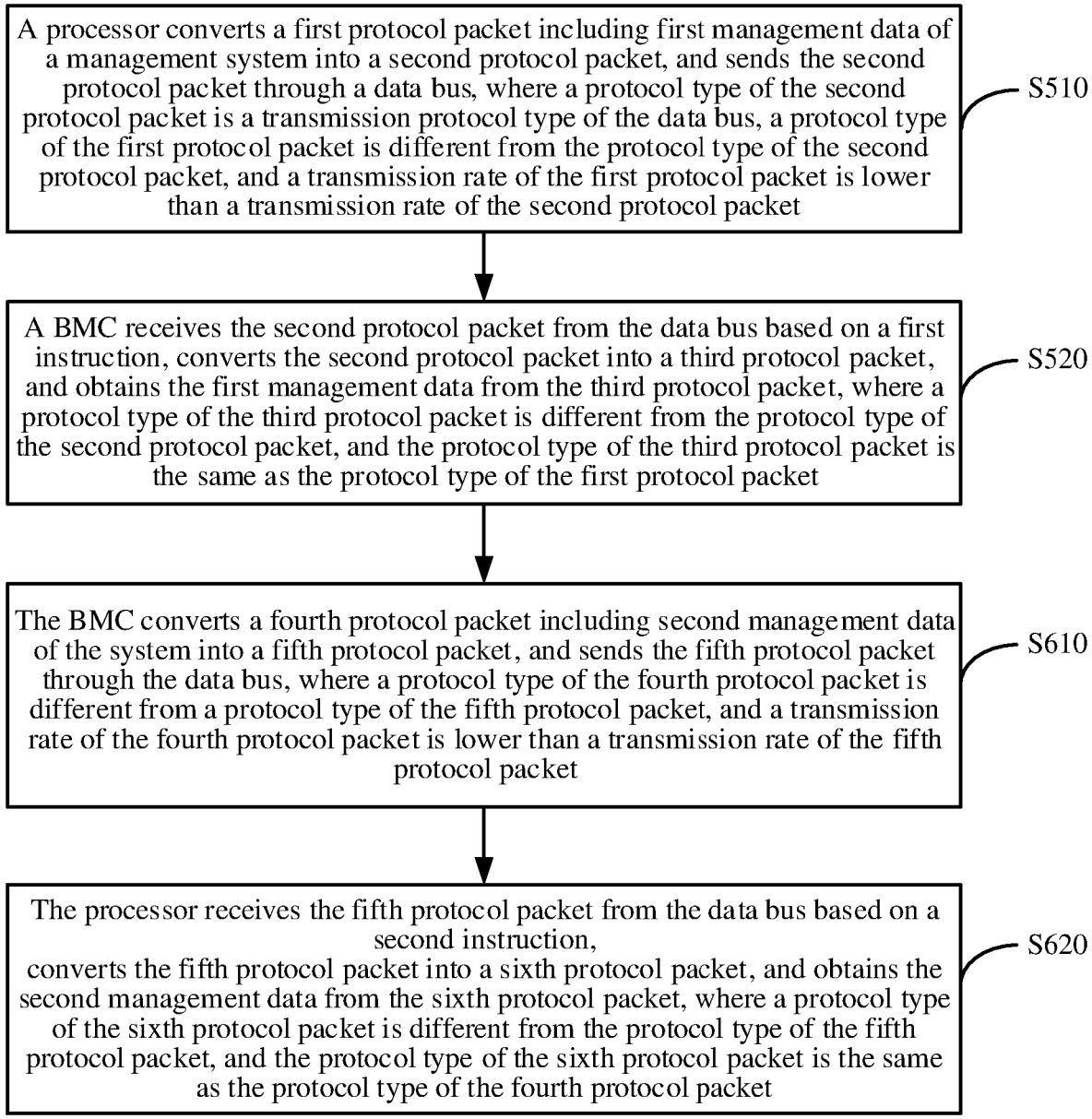
FIG. 6 is a flowchart of a system management method according to an embodiment of this application.

Optionally, as shown in FIG. 6, the system management method may further include the following steps:

S610: The BMC converts a fourth protocol packet including second management data of the system into a fifth protocol packet, and sends the fifth protocol packet through a data bus, where a protocol type of the fourth protocol packet is different from a protocol type of the fifth protocol packet. In addition, a transmission rate of the fourth protocol packet is lower than a transmission rate of the fifth protocol packet.

S620: The processor receives the fifth protocol packet from the data bus based on a second instruction, converts the fifth protocol packet into a sixth protocol packet, and obtains the second management data from the sixth protocol packet, where a protocol type of the sixth protocol packet is different from the protocol type of the fifth protocol packet. The protocol type of the sixth protocol packet is the same as the protocol type of the fourth protocol packet. The second instruction is an instruction (for example, an interrupt signal) sent by the BMC to the processor through a control bus, or a periodic instruction generated by the processor.

The protocol type of the fourth protocol packet may be a BT protocol type, a KCS protocol type, or a MAILBOX protocol type; and the protocol type of the fifth protocol packet may be a PCIe transmission protocol type, a USB transmission protocol type, or a transmission protocol type of another bus.

It can be learned that, when the BMC sends data to the processor, the BMC is responsible for converting a protocol packet with a low transmission rate into a protocol packet with a high transmission rate, and sending a protocol-converted packet to the processor through the data bus. The processor is responsible for converting the protocol packet with a high transmission rate into a protocol packet with a low transmission rate, to obtain the second management data, so that bidirectional data transmission between the processor and the BMC is implemented.

Figure 7:
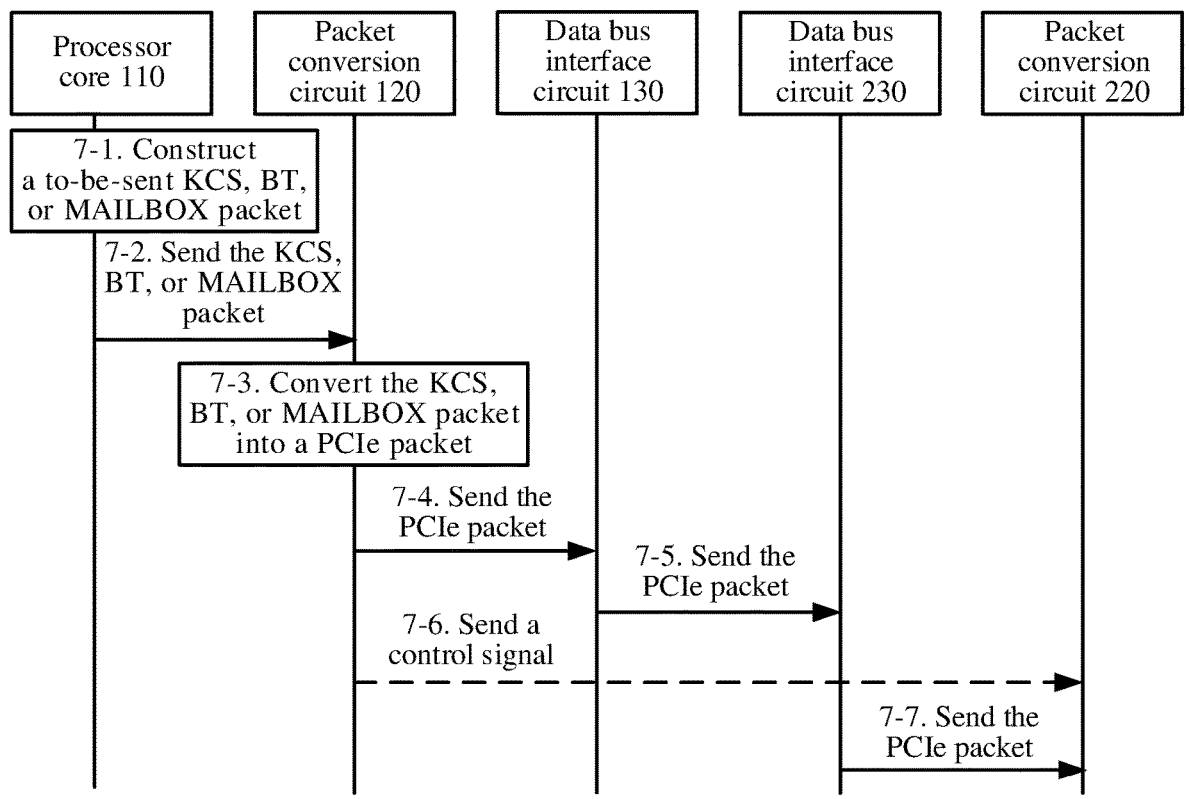
FIG. 7 is a schematic diagram of information exchange for a system management method according to an embodiment of this application.

FIG. 7 is a schematic diagram of information exchange for a system management method according to an embodiment of this application. As shown in FIG. 7, an implementation process of the system management method is described by using an example in which the processor 100 in FIG. 3 sends a KCS, BT, or MAILBOX packet to the BMC 200, and the data bus 300 is a PCIe bus.

7-1. A processor core 110 of the processor 100 constructs a to-be-sent KCS, BT or MAILBOX packet.

7-2. The processor core 110 sends the KCS, BT, or MAILBOX packet to a packet conversion circuit 120 of the processor 100. For example, the processor core 110 writes packet content of the KCS, BT, or MAILBOX packet into the packet conversion circuit 120.

7-3. The packet conversion circuit 120 converts the KCS, BT, or MAILBOX packet into a PCIe packet.

7-4. The packet conversion circuit 120 sends the PCIe packet to a data bus interface circuit 130 of the processor core 110.

7-5. The data bus interface circuit 130 sends the PCIe packet to a data bus interface circuit 230 of the BMC 200.

7-6. If a control bus 400 configured to trigger data receiving is included between the processor 100 and the BMC 200, the packet conversion circuit 120 may further send, to a packet conversion circuit 220 of the BMC 200, a control signal indicating the BMC 200 to receive the PCIe packet. The control signal may be an interrupt signal, or another control signal that may indicate the BMC 200 to receive a packet. For example, the packet conversion circuit 120 triggers message interruption to the packet conversion circuit 220.

7-7. The data bus interface circuit 230 of the BMC 200 sends the PCIe packet to the packet conversion circuit 220. When only the data bus 300 is included between the processor 100 and the BMC 200, the packet conversion circuit 220 of the BMC 200 may periodically obtain the PCIe packet from the data bus interface circuit 230 of the BMC 200. When the data bus 300 and a control bus 400 are included between the processor 100 and the BMC 200, the packet conversion circuit 220 of the BMC 200 may obtain the PCIe packet from the data bus interface circuit 230 of the BMC 200 based on the control signal.

It can be learned that, the processor 100 may send the KCS, BT, or MAILBOX packet to the BMC 200 through the PCIe bus, which satisfies a requirement of transmitting a large amount of management data in a management system.

Figure 8:
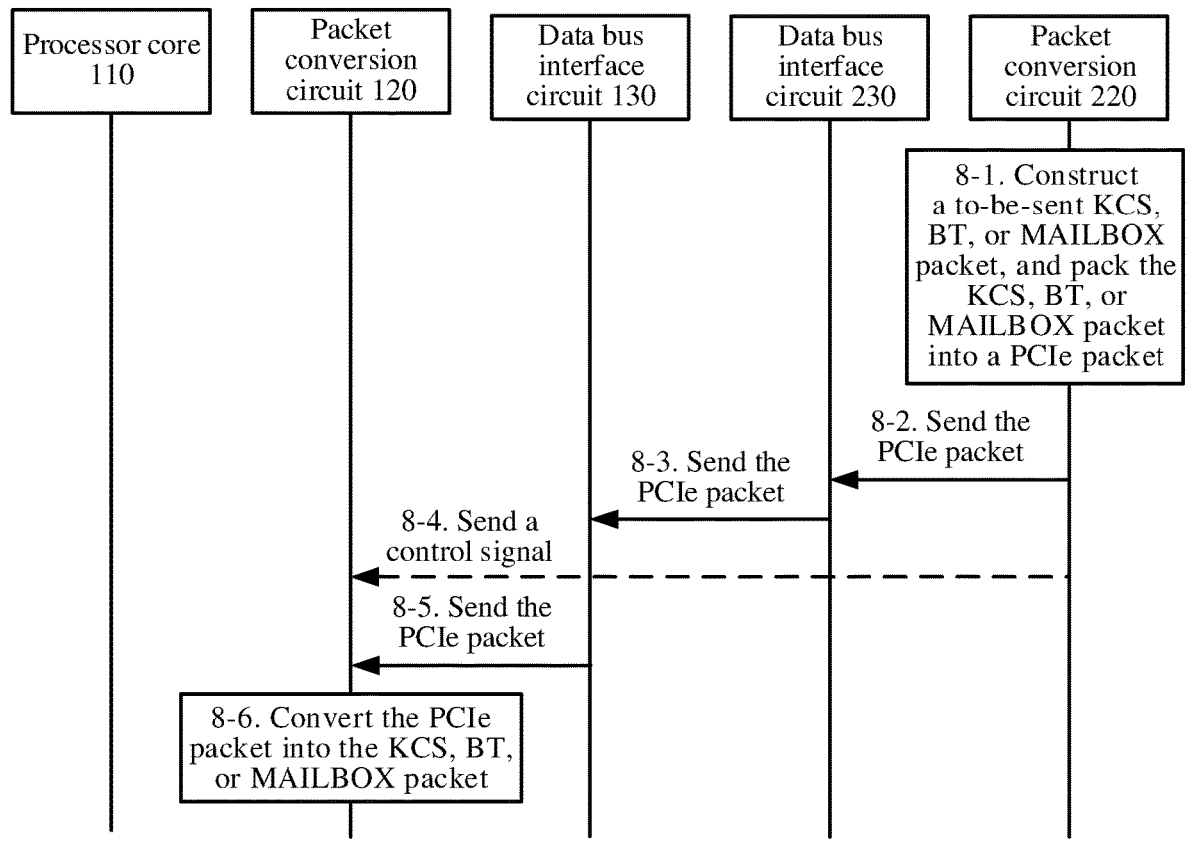
FIG. 8 is a schematic diagram of information exchange for a system management method according to an embodiment of this application.

FIG. 8 is a schematic diagram of information exchange for a system management method according to an embodiment of this application. As shown in FIG. 8, an implementation process of the system management method is described by using an example in which the BMC 200 sends a KCS, BT, or MAILBOX packet to the processor 100 in FIG. 3, and the data bus 300 is a PCIe bus.

8-1. A packet conversion circuit 220 of the BMC 200 constructs a to-be-sent KCS, BT, or MAILBOX packet, and packs the KCS, BT, or MAILBOX packet into a PCIe packet.

8-2. The packet conversion circuit 220 sends the PCIe packet to a data bus interface circuit 230 of the BMC 200.

8-3. The data bus interface circuit 230 sends the PCIe packet to a data bus interface circuit 130 of the processor 100.

8-4. If a control bus 400 configured to trigger data receiving is included between the processor 100 and the BMC 200, the packet conversion circuit 220 further sends, to a packet conversion circuit 120, a control signal indicating to receive the PCIe packet. The control signal may be an interrupt signal, or another control signal that may indicate the packet conversion circuit 120 to receive a packet. For example, the packet conversion circuit 220 triggers message interruption to the packet conversion circuit 120.

8-5. The data bus interface circuit 130 sends the PCIe packet to the packet conversion circuit 120 of the processor 100. When only the data bus 300 is included between the processor 100 and the BMC 200, the packet conversion circuit 120 may periodically obtain the PCIe packet from the data bus interface circuit 130 of the processor 100. When the data bus 300 and the control bus 400 are included between the processor 100 and the BMC 200, the packet conversion circuit 120 may obtain the PCIe packet from the data bus interface circuit 130 of the processor 100 based on the control signal.

8-6. The packet conversion module 120 converts the PCIe packet into the KCS, BT, or MAILBOX packet.

It can be learned that the BMC 200 may send the KCS, BT, or MAILBOX packet to the processor 100 through the PCIe bus, which satisfies a requirement of transmitting a large amount of management data in a management system.

Figure 9:
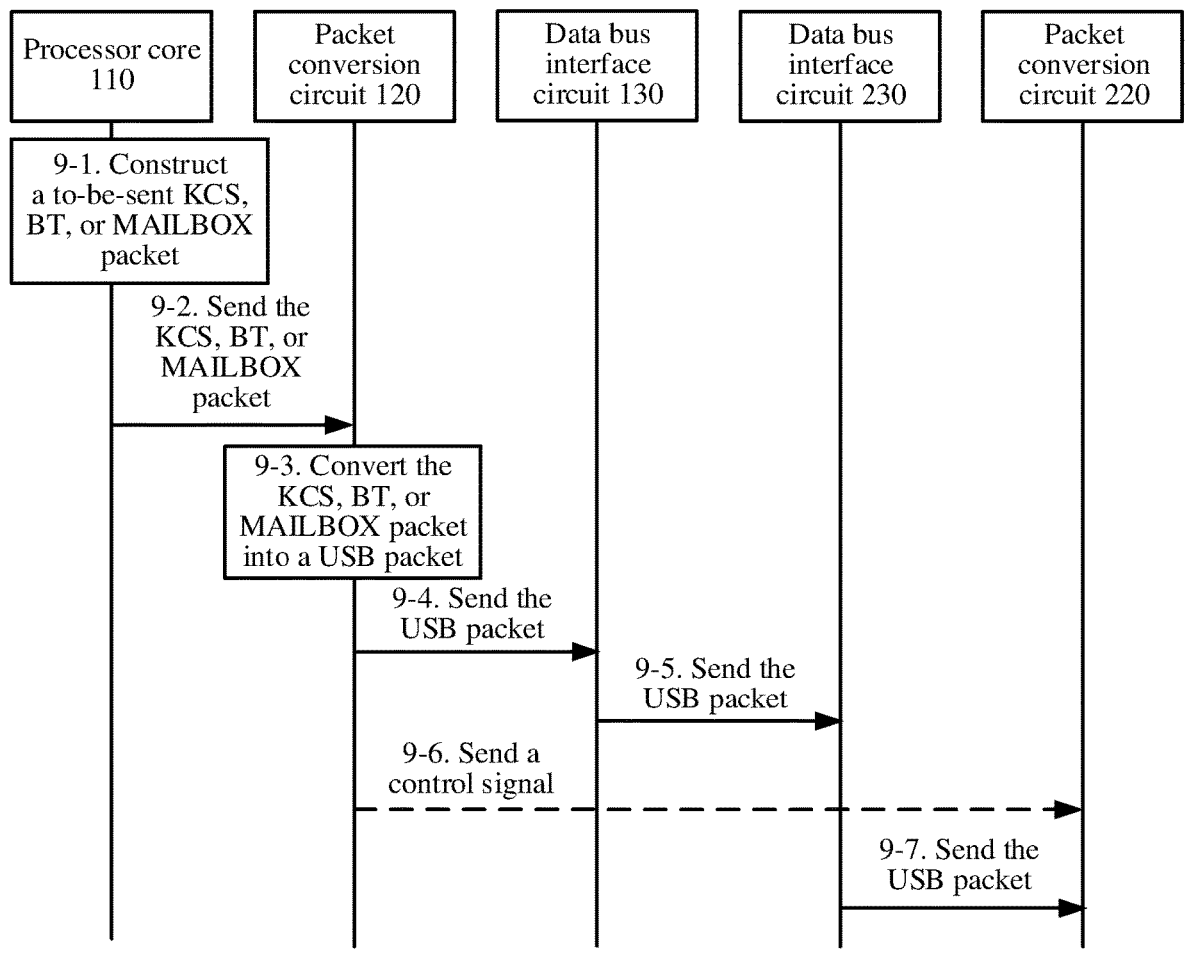
FIG. 9 is a schematic diagram of information exchange for a system management method according to an embodiment of this application.

FIG. 9 is a schematic diagram of information exchange for a system management method according to an embodiment of this application. As shown in FIG. 9, an implementation process of the system management method is described by using an example in which the processor 100 in FIG. 3 sends a KCS, BT, or MAILBOX packet to the BMC 200, and the data bus 300 is a PCIe bus:

9-1. A processor core 110 of the processor 100 constructs a to-be-sent KCS, BT or MAILBOX packet.

9-2. The processor core 110 sends the KCS, BT, or MAILBOX packet to a packet conversion circuit 120 of the processor 100. For example, the processor core 110 writes packet content of the KCS, BT, or MAILBOX packet into the packet conversion circuit 120.

9-3. The packet conversion circuit 120 converts the KCS, BT, or MAILBOX packet into a USB packet.

9-4. The packet conversion circuit 120 sends the USB packet to a data bus interface circuit 130 of the processor core 110.

9-5. The data bus interface circuit 130 sends the USB packet to a data bus interface circuit 230 of the BMC 200.

9-6. If a control bus 400 configured to trigger data receiving is included between the processor 100 and the BMC 200, the packet conversion circuit 120 may further send, to a packet conversion circuit 220 of the BMC 200, a control signal indicating the BMC 200 to receive the USB packet. The control signal may be an interrupt signal, or another control signal that may indicate the BMC 200 to receive a packet. For example, the packet conversion circuit 120 triggers message interruption to the packet conversion circuit 220.

9-7. The data bus interface circuit 230 of the BMC 200 sends the USB packet to the packet conversion circuit 220. When only the data bus 300 is included between the processor 100 and the BMC 200, the packet conversion circuit 220 of the BMC 200 may periodically obtain the USB packet from the data bus interface circuit 230 of the BMC 200. When the data bus 300 and the control bus 900 are included between the processor 100 and the BMC 200, the packet conversion circuit 220 of the BMC 200 may obtain the USB packet from the data bus interface circuit 230 of the BMC 200 based on the control signal.

It can be learned that, the processor 100 may send the KCS, BT, or MAILBOX packet to the BMC 200 through the USB bus, which satisfies a requirement of transmitting a large amount of management data in a management system.

Figure 10:
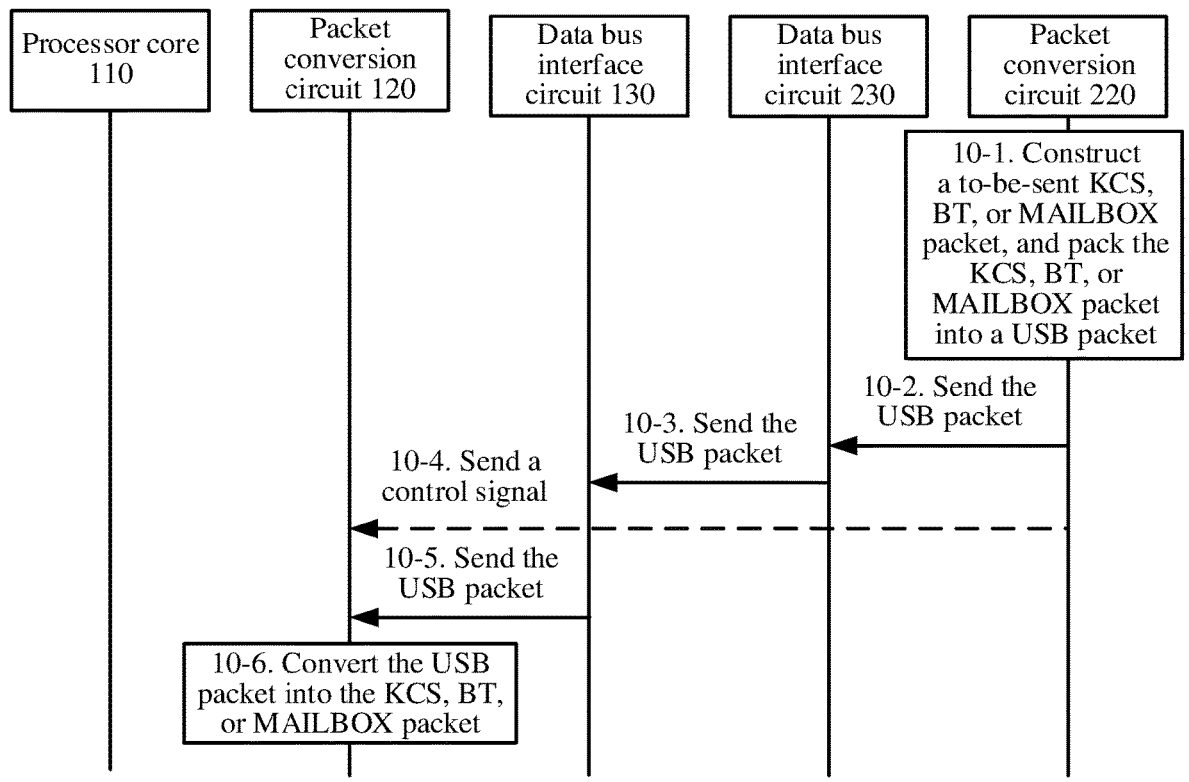
FIG. 10 is a schematic diagram of information exchange for a system management method according to an embodiment of this application.

FIG. 10 is a schematic diagram of information exchange for a system management method according to an embodiment of this application. As shown in FIG. 10, an implementation process of the system management method is described by using an example in which the BMC 200 sends a KCS, BT, or MAILBOX packet to the processor 100 in FIG. 3, and the data bus 300 is a USB bus:

10-1. A packet conversion circuit 220 of the BMC 200 constructs a to-be-sent KCS, BT, or MAILBOX packet, and packs the KCS, BT, or MAILBOX packet into a USB packet.

10-2. The packet conversion circuit 220 sends the USB packet to a data bus interface circuit 230 of the BMC 200.

10-3. The data bus interface circuit 230 sends the USB packet to a data bus interface circuit 130 of the processor 100.

10-4. If a control bus 400 configured to trigger data receiving is included between the processor 100 and the BMC 200, the packet conversion circuit 220 further sends, to a packet conversion circuit 120, a control signal indicating to receive the USB packet. The control signal may be an interrupt signal, or another control signal that may indicate a packet conversion circuit 120 to receive a packet. For example, the packet conversion circuit 220 triggers message interruption to the packet conversion circuit 120.

10-5. The data bus interface circuit 130 sends a USB packet to the packet conversion circuit 120 of the processor 100. When only the data bus 300 is included between the processor 100 and the BMC 200, the packet conversion circuit 120 may periodically obtain the USB packet from the data bus interface circuit 130 of the processor 100. When the data bus 300 and the control bus 400 are included between the processor 100 and the BMC 200, the packet conversion circuit 120 may obtain the USB packet from the data bus interface circuit 130 of the processor 100 based on the control signal.

10-6. A packet conversion module 110 converts the USB packet into the KCS, BT, or MAILBOX packet.

It can be learned that, the BMC 200 may send the KCS, BT, or MAILBOX packet to the processor 100 through the USB bus, which satisfies a requirement of transmitting a large amount of management data in a management system.

Figure 11:
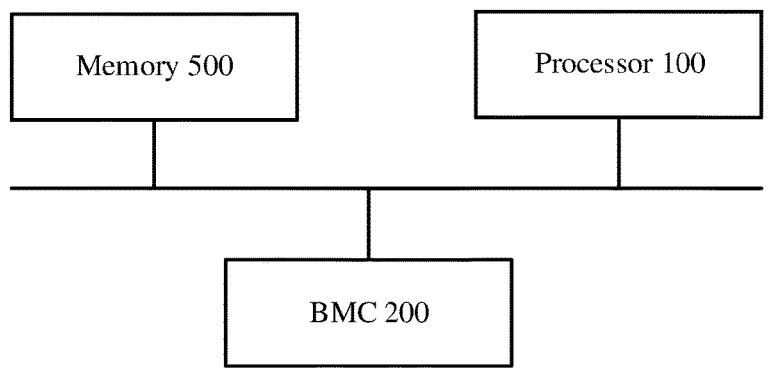
FIG. 11 is a schematic diagram of a structure of a computing device according to an embodiment of this application.

FIG. 11 is a schematic diagram of a structure of a computing device according to an embodiment of this application. As shown in FIG. 11, the computing device may include a processor 100, a BMC 200, and a memory 500. The memory 500 stores computer instructions. The processor 100 and the BMC 200 execute the computer instruction, so that the computing device performs the method shown in any one of FIG. 5 to FIG. 10.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or any other programmable apparatus. The computer instruction may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be understood that numerical symbols involved in the embodiments of this application are differentiated merely for ease of description, but are not used to limit the scope of the embodiments of this application.

What is claimed is:

1. A management system, comprising:
   at least one processor;
   a baseboard management controller (BMC), wherein a data bus for data transmission is situated between the at least one processor and the BMC; and
   one or more memories, wherein the one or more memories store first programming instructions for execution by the at least one processor to:
   convert a first protocol packet comprising first management data of the management system into a second protocol packet; and
   send the second protocol packet through the data bus, wherein a protocol type of the second protocol packet is a transmission protocol type of the data bus, a protocol type of the first protocol packet is different from the protocol type of the second protocol packet, and a transmission rate of the first protocol packet is lower than a transmission rate of the second protocol packet; and
   wherein the BMC is configured to:
   receive the second protocol packet from the data bus based on a first instruction;
   convert a fourth protocol packet comprising second management data of the management system into a fifth protocol packet; and
   send the fifth protocol packet through the data bus, wherein a protocol type of the fourth protocol packet is different from a protocol type of the fifth protocol packet, and a transmission rate of the fourth protocol packet is lower than a transmission rate of the fifth protocol packet.

2. The management system according to claim 1, wherein a control bus configured to control the management system to perform data transmission through the data bus is further situated between the at least one processor and the BMC.

3. The management system according to claim 1, wherein the first instruction is a periodic instruction generated by the BMC, or an instruction sent by the at least one processor to the BMC through a control bus, wherein the control bus is a bus that is between the at least one processor and the BMC and that is configured to control the management system to perform data transmission through the data bus.

4. The management system according to claim 1, wherein the one or more memories store the second programming instructions for execution by the BMC to:
convert the second protocol packet into a third protocol packet; and
obtain the first management data from the third protocol packet, wherein a protocol type of the third protocol packet is the same as the protocol type of the first protocol packet.

5. The management system according to claim 1, wherein:
the one or more memories store the first programming instructions for execution by the at least one processor to:
receive the fifth protocol packet from the data bus based on a second instruction, wherein the second instruction is an instruction sent by the BMC to the at least one processor through a control bus, or a periodic instruction generated by the at least one processor, and the control bus is a bus that is between the at least one processor and the BMC and that is configured to control the management system to perform data transmission through the data bus;
convert the fifth protocol packet into a sixth protocol packet and
obtain the second management data from the sixth protocol packet, wherein a protocol type of the sixth protocol packet is the same as the protocol type of the fourth protocol packet.

6. The management system according to claim 1, wherein the data bus comprises at least one of a peripheral component interconnect express (PCIe) and a universal serial bus (USB).

7. The management system according to claim 1, wherein the protocol type of the first protocol packet comprises one or more of a block transfer (BT) protocol type, a keyboard controller style (KCS) protocol type, or a mailbox protocol type.

8. A processing chip, comprising a processor core, a packet conversion circuit, and a data bus interface circuit, wherein
the packet conversion circuit is configured to convert a first protocol packet comprising first management data into a second protocol packet;
the data bus interface circuit is configured to send the second protocol packet, wherein a protocol type of the second protocol packet is a transmission protocol type of the data bus interface circuit, a protocol type of the first protocol packet is different from a protocol type of the second protocol packet, and a transmission rate of the first protocol packet is lower than a transmission rate of the second protocol packet;
the data bus interface circuit is further configured to receive a fifth protocol packet, wherein the fifth protocol packet is generated by converting a fourth protocol packet comprising second management data, a protocol type of the fourth protocol packet is different from a protocol type of the fifth protocol packet, and a transmission rate of the fourth protocol packet is lower than a transmission rate of the fifth protocol packet.

9. The processing chip according to claim 8, wherein the processing chip further comprises a control bus circuit, wherein
the control bus circuit is configured to send a first instruction, and the first instruction indicates to receive the second protocol packet.

10. The processing chip according to claim 9, wherein the packet conversion circuit is further configured to generate the first instruction.

11. The processing chip according to claim 8, wherein the data bus interface circuit comprises at least one of a peripheral component interconnect express (PCIe) interface circuit and a universal serial bus (USB) interface circuit.

12. The processing chip according to claim 8, wherein the protocol type of the first protocol packet comprises one or more of a block transfer (BT) protocol type, a keyboard controller style (KCS) protocol type, and a mailbox protocol type.

13. A system management method, comprising:
converting a first protocol packet comprising first management data of a system into a second protocol packet;
sending the second protocol packet through a data bus, wherein a protocol type of the second protocol packet is a transmission protocol type of the data bus, a protocol type of the first protocol packet is different from the protocol type of the second protocol packet, and a transmission rate of the first protocol packet is lower than a transmission rate of the second protocol packet;
receiving the second protocol packet from the data bus based on a first instruction;
converting the second protocol packet into a third protocol packet, wherein a protocol type of the third protocol packet is different from the protocol type of the second protocol packet, and the protocol type of the third protocol packet is the same as the protocol type of the first protocol packet;
obtaining the first management data from the third protocol packet;
converting a fourth protocol packet comprising second management data of the system into a fifth protocol packet; and
sending the fifth protocol packet through the data bus, wherein a protocol type of the fourth protocol packet is different from a protocol type of the fifth protocol packet, and a transmission rate of the fourth protocol packet is lower than a transmission rate of the fifth protocol packet.

14. The system management method according to claim 13, wherein the second protocol packet comprises at least one of a peripheral component interconnect express (PCIe) packet and a universal serial bus (USB) packet.

15. The system management method according to claim 13, wherein the protocol type of the first protocol packet or the third protocol packet comprises one or more of a block transfer (BT) protocol type, a keyboard controller style (KCS) protocol type, and a mailbox protocol type.

16. The system management method according to claim 13, wherein the first instruction comprises an instruction generated by a control bus, or an instruction generated periodically.

17. The system management method according to claim 13, further comprising:
   receiving the fifth protocol packet from the data bus based on a second instruction;
   converting the fifth protocol packet into a sixth protocol packet; and
   obtaining the second management data from the sixth protocol packet, wherein a protocol type of the sixth protocol packet is the same as the protocol type of the fourth protocol packet.

18. The system management method according to claim 17, wherein the second instruction is an instruction sent through a control bus, and the control bus is configured to control performing data transmission through the data bus.

19. The system management method according to claim 13, wherein the protocol type of the fourth protocol packet comprises one or more of a BT protocol type, a KCS protocol type, and a mailbox protocol type.

20. The system management method according to claim 13, wherein the protocol type of the fifth protocol packet comprises at least one of a PCIe packet and a USB packet.

* * * * *